United States Patent [19]

Sheng et al.

[11] Patent Number: 4,796,270
[45] Date of Patent: Jan. 3, 1989

[54] COMPACT RIGID DYE LASER CONSTRUCTION

[75] Inventors: Shinan-Chur Sheng, Sunnyvale; Stephen C. Wolgast, Fremont, both of Calif.

[73] Assignee: Spectra-Physics, Inc., San Jose, Calif.

[21] Appl. No.: 40,542

[22] Filed: Apr. 17, 1987

[51] Int. Cl.[4] .................................... H01S 3/20
[52] U.S. Cl. ............................. 372/54; 372/93
[58] Field of Search ............ 372/53, 54, 92, 93, 372/107

[56] References Cited

U.S. PATENT DOCUMENTS 3,873,941  3/1975  Yarborough et al. .............. 372/
4,403,324  9/1983  Wöste ................................ 372/54

FOREIGN PATENT DOCUMENTS 2087136  5/1982  United Kingdom .............. 372/93

Primary Examiner—William L. Sikes
Assistant Examiner—B. Randolph
Attorney, Agent, or Firm—Donald C. Feix; Paul Davis; T. M. Freiburger

[57] ABSTRACT

A dye laser is of compact, rigid and simple construction, with a folded resonator cavity contained on a single rigid block of material, such as aluminum. The block has two or three mirror mount locations, at least one of which is a machined surface which receives a mirror directly and rigidly, without provision for adjustment. The other mirror mount location(s) has an adjustable mirror mount, and this may be the mirror mount for the output mirror. A dye jet mounting block has a flat surface which engages against a flat surface on the exterior of the laser block, with fasteners allowing for rotation and translation of the dye jet block on the laser resonator block to provide for both rotational and translational tuning adjustment of the dye jet with respect to the resonator cavity and a pumping beam. The pumping beam preferably is folded by an adjustable pump mirror on its approach to the dye jet. A mirror adjustment for the output mirror may include a spherical adjustment device, wherein a circular mounting plate of the mirror engages in a spherical depression formed in an outside surface of the laser block, so that sliding movements of the mirror in the spherical depression will effect desired angular adjustments of the mirror.

11 Claims, 3 Drawing Sheets

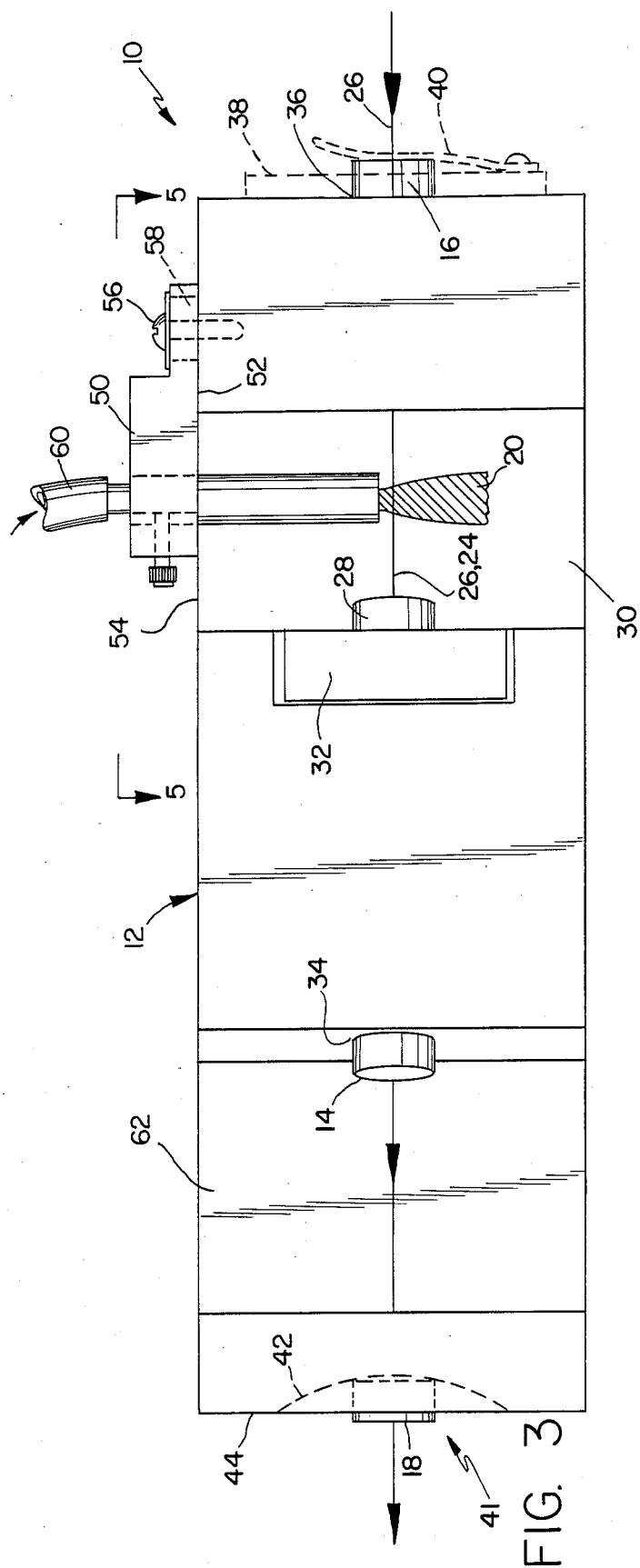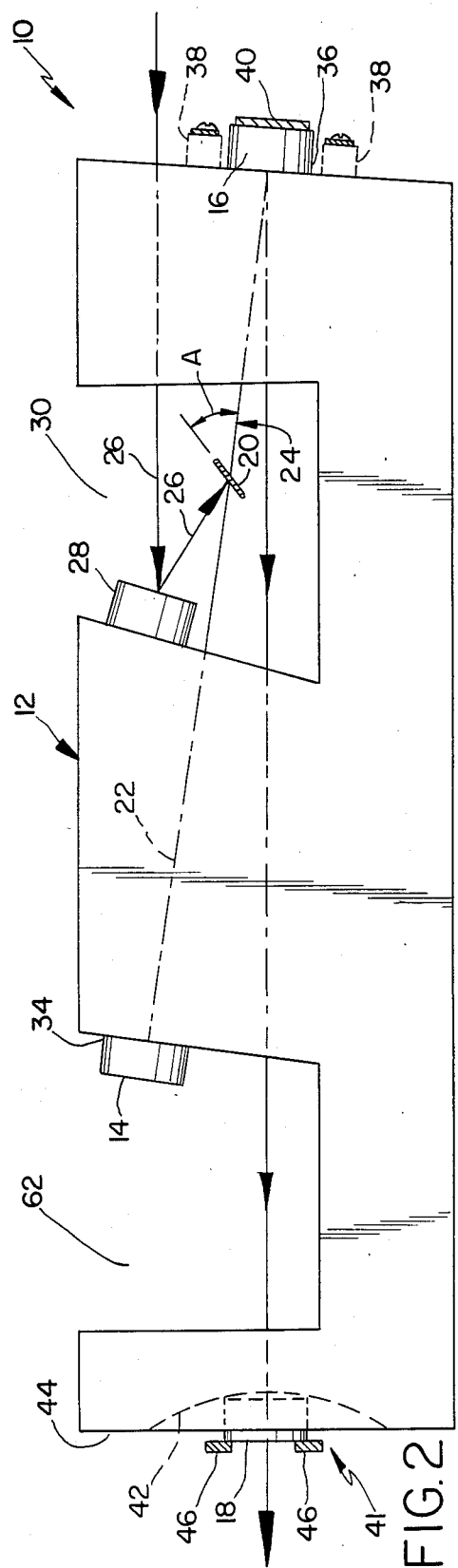

COMPACT RIGID DYE LASER CONSTRUCTION

BACKGROUND OF THE INVENTION

The invention relates to dye lasers, and more particularly to an improved construction of a dye laser wherein the laser structure and resonator cavity is simple, rugged, stable and efficiently produced.

Dye lasers have typically been comprised of a great number of parts assembled together, including resonator components such as elongated bars, fairly complex adjustable mirror mounts for at least several of the resonator cavity mirrors, and elaborate mechanical arrangements for adjustment of the position and orientation of the dye jet. Construction of such dye lasers has been relatively costly and labor intensive, and there has been a considerable potential for instability of the assembled laser due to the number and complexity of assembled parts.

Dye lasers are useful because they are tunable to a range of different wavelengths. Tuning of a dye laser may be accomplished by tuning elements positioned in the laser resonator cavity. A dye laser may be tunable within a range including, for example, yellow-orange light through deep red.

Cavity length, mirror orientation and position and orientation of the dye jet in a dye laser are critical to optimum performance and maximum beam power.

Dye lasers have been produced with two-mirror cavities and three-mirror folded cavities. The two-mirror cavity is simpler in design, but three-mirror cavities have certain advantages, such as a better ability to compensate for astigmatism.

It is a general object of the present invention to improve the construction, cost efficiency and rugged stability of both two-mirror dye lasers and three-mirror dye lasers, while still allowing for tunability and fine cavity adjustments.

SUMMARY OF THE INVENTION

In accordance with the dye laser construction of the present invention, a resonator is formed of a rigid block for supporting the two mirrors of a two-mirror cavity or the three mirrors of a three-mirror cavity. In either event, at least one of the cavity mirrors is rigidly fixed to a surface at a mount location on the rigid block, and all cavity mirrors may be so fixed. For some applications one mirror, which may be the output mirror, is provided with a means for adjustment as to tilt and longitudinal position. Complex mirror mounts are avoided.

A pumping beam for the dye laser preferably is folded, with an adjustable mirror mount for a focussing pump mirror connected to the rigid block.

Another important feature of a dye laser constructed in accordance with the invention is the manner of construction and adjustment of the dye jet nozzle mounting block, which includes a dye jet nozzle for producing the jet which extends across the path of both the pumping beam and the dye laser beam. The rigid laser resonator block has a flat side surface parallel to the plane of the dye laser beam, while the nozzle mounting block has a flat surface which engages against this flat side surface of the laser block. Fasteners for securing the nozzle mounting block down against the rigid laser block include provision for rotation of the mounting block, effecting rotation of the dye jet, and for translational movement of the nozzle mounting block, in a range of motion in X and Y directions. Thus, the nozzle mounting block and the dye jet are easily and fully adjustable with a very simple and rugged mechanism.

Another feature of the invention is the use of a special mirror angulation adjustment arrangement, previously known but only on other types of lasers and without the advantages achieved with the present invention. A spherical depression is formed directly on a surface of the rigid laser resonator block of the invention, and a circular mounting plate or a circular surface of the mirror itself is engaged and seated against the spherical depression. Sliding movement of the mirror in the spherical depression will effect a shift in the angular orientation of the mirror. Fastening means are provided for tightening the mirror down against the surface of the spherical depression when adjustments have been completed.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DESCRIPTION OF THE DRAWINGS

FIG. 2 is a side elevation view showing schematically the laser resonator with its resonator mirrors and the pump mirror, and indicating the pumping beam and the dye laser beams.

FIG. 3 is a plan view of the laser assembly, indicating a dye jet nozzle and mounting block attached to the side of the resonator block so as to permit full adjustment of the dye jet position and orientation.

DESCRIPTION OF PREFERRED EMBODIMENTS

Figure 1:
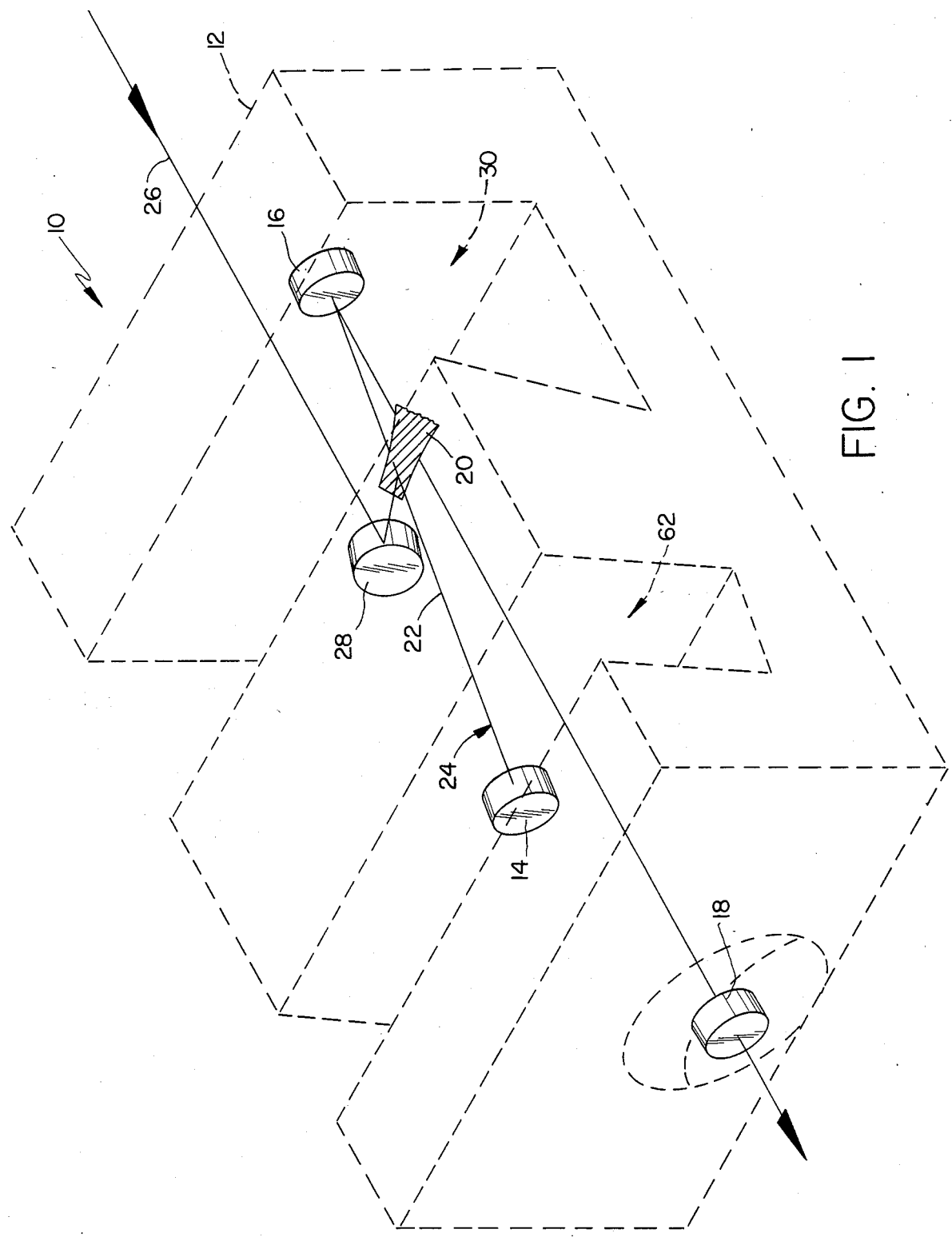
FIG. 1 is a perspective view schematically indicated in dashed lines a laser resonator block in accordance with the invention, with three mirrors shown in a folded-cavity configuration and a fourth pump mirror also shown, generally in positions the mirrors occupy on the resonator block. A pumping beam and a resonating dye laser beam are indicated.

In the drawing, FIG. 1 shows diagrammatically the major components and beam paths of a rigidly constructed dye laser 10 in accordance with the principles of the invention.

The dye laser 10 includes a solid block 12 (dashed lines) which forms a very important feature of the invention and on which all mirrors and a dye jet nozzle are mounted. It is an important feature of the invention that the solid mounting block 12 has surfaces formed with reasonable precision at most or all of its mirror mount locations, so that preferably only one mirror of the laser's optical cavity need be fully adjustable.

Figure 4:
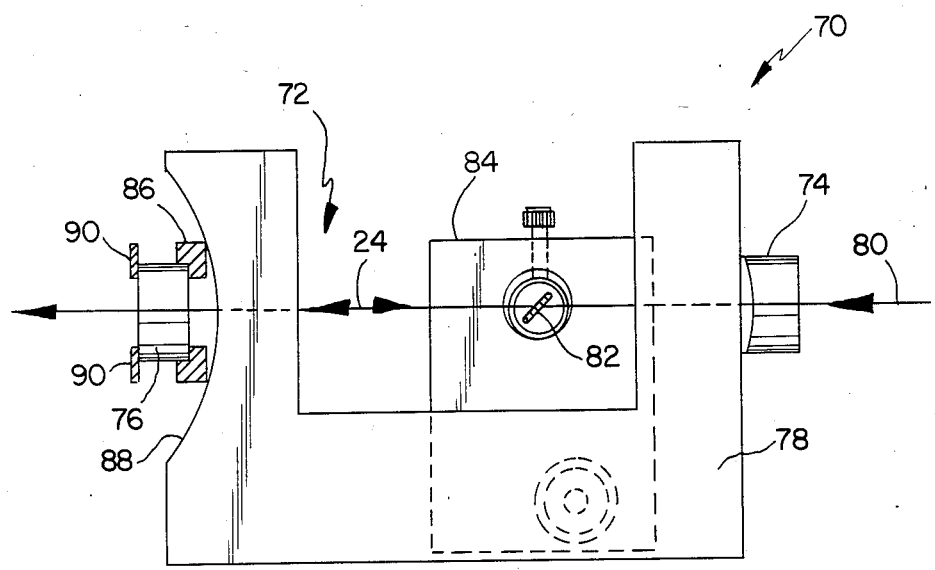
FIG. 4 is a side elevation view or plan view showing another embodiment of the invention, wherein the beam cavity is not folded and includes two mirrors.

The drawing figures show a folded cavity dye laser, including three mirrors 14, 16, 18, although a straight two-mirror cavity can also be constructed under the principles of the invention (FIG. 4). In the three-mirror folded cavity laser construction shown, the mirror 18 at the exterior of the block 12 is an output mirror, and a dye jet indicated at 20 is positioned in a shorter leg 22 of the folded laser cavity, in the path of the laser beam 24 which resonates from the end mirror 14 to the end mirror 18, via the beam path folding mirror 16 as indicated.

A pumping beam for the laser 10 is indicated at 26, approaching and intersecting the dye jet 20 via a pump mirror 28, which is adjustable. The pumping beam 26 may comprise the beam of an argon laser, for example. The pump mirror 28 serves to focus the pumping beam onto the dye jet 20.

As shown in FIGS. 2 and 3, the pump mirror 28 may be mounted on the block 12 at one side of a transverse cutout or recess 30. The mounting of the mirror 28 may be with any conventional adjustable apparatus such as the kind having adjustment screws for tilting the mirror on two orthogonal axes, thereby permitting full tilt adjustment in any direction and also affording in/out adjustment movement and up/down side-to-side translational movement of the mirror, so that the pumping beam 26 may be made to strike the dye jet 20 at a precise selected location and at a precise angle for optimum power in the generated laser beam 24. An adjustable pumping mirror mount schematically indicated at 32 in FIG. 3 may be fixed to the laser block 12 by any suitable means, such as glue or fasteners. Alternatively, the pump mirror 28 may be secured and adjustable by a mount system described below in relation to the output mirror 18; or the pump mirror may be fixed to a surface of the laser block as described below (mirrors 14, 16), and as indicated in FIG. 2, and the laser assembly 10 may be made adjustable as to the point at which the pumping beam 26 strikes the dye jet 20.

In accordance with the invention, at least one of the mirrors 14, 16, 18, and preferably at least two mirrors, which may be the two mirrors 14 and 16 illustrated in the drawing, are rigidly fixed to precision-formed surfaces 34 and 36 on the laser mounting block 12. The precision-formed surfaces 34 and 36 may be machined, and are relatively precise in angular orientation and in separation distance. The faces of the mirrors 14 and 16, or of mounting frames or disks to which they are fixed, press directly against the surfaces 34 and 36, and may be held there by any suitable device, such as the plates 38 illustrated, with a leaf spring 40 pressing against each mirror to engage the face of the mirror against the precision surface (see mirror 16).

The output mirror 18 may be mounted differently, with an adjustable mount for adjusting the tilt of the mirror 18 and for finely adjusting the length of the beam cavity so as to permit optimizing of beam power after the laser 10 has been assembled.

A special type of adjustable mirror mount, known on some lasers previous to this invention but in different arrangements is particularly adapted to the rigid laser construction of the present invention. The output mirror mount 41 comprises a spherically formed concave dish 42 directly formed into a terminal face 44 of the laser block 12 as illustrated in the drawings. The mirror 18 has a face (or a mounting plate to which it is fixed) which is circular to a relatively precise degree. The mirror face is engaged against the concave sperical depression 42. Any adjustment movement of the mirror (side-to-side or up-down) results in a slight tilting adjustment of the mirror. In this way, a fine tuning of the mirror's tilt adjustment can be achieved. The mirror may be pressed against the concave surface 42 by any suitable type of fastening means which will not interfere with the output beam path, such as a slotted leaf spring 46 as indicated in FIG. 2. With this type of mirror mount 18, when the laser 10 is used in applications where cavity length is critical, fine tuning of cavity length can be achieved by using appropriate shims under one of the other cavity mirrors 14 or 16.

In one preferred embodiment of the invention, all three resonator cavity mirrors 14, 16 and 18 are rigidly fixed to precision-formed surfaces on the laser block 12. One of such surfaces may be the spherical surface 42 for the mirror 18.

Figure 5:
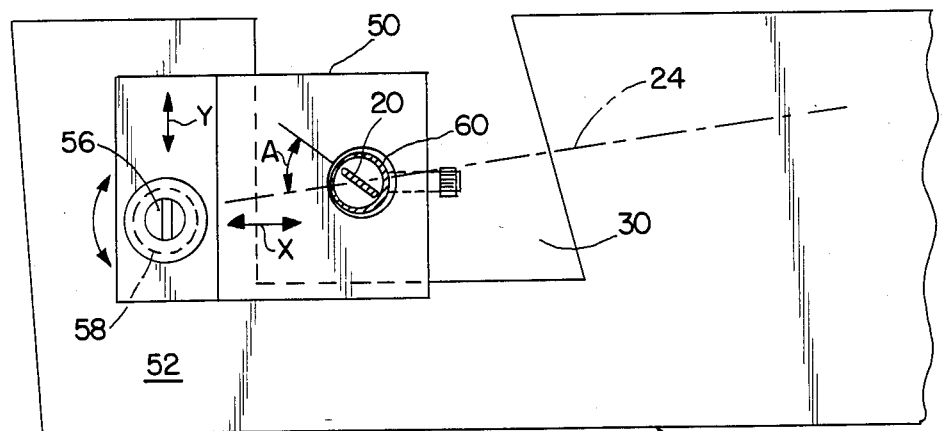
FIG. 5 is a partial view showing the dye jet nozzle mounting block and its manner of adjustment, as seen along the line 5—5 in FIG. 3.

The manner of mounting a laser nozzle mounting block 50 onto the laser block 12 also forms an important feature of the invention, shown particularly in FIGS. 3 and 5. The dye jet mounting block 50 has a flat surface 52 which is received flatly against a flat surface 54 on the exterior of the laser mounting block 12. The flat surface 54 on the side of the block 12 is parallel to the plane of the dye beam. Fasteners such as a screw 56 pass through slotted or otherwise enlarged holes 58 in the nozzle mounting block, permitting X and Y (side-to-side and up/down) adjustment movement of the dye jet mounting block with respect to the laser block 12. This also affords rotational adjustment of the dye jet mounting block 50, all while the block 50 remains engaged flatly against the block 12. This arrangement enables the position and angular orientation of the dye jet 20 to be manipulated in every adjustment necessary for optimizing the output of the dye laser 10. In particular, the angle A that the flat dye jet stream or fan 20 makes wth the lower cavity is critical, so that adjustment must be facilitated. Translational movement of the nozzle and jet 20 can be used to adjust focus of the pumping beam 26 on the jet, and up/down translation adjustment can tune to a "sweet spot" on the dye jet. FIG. 5 shows further features of the nozzle block mounting and adjusting arrangement.

As shown in FIG. 3, the dye for the dye laser, which may comprise Rhodamine-6G, is conducted into the dye jet nozzle mounting block 50 and ultimately to the jet stream or far 20 by an input tube 60, in the well-known manner. The dye stream is then collected and returned to a reservoir (not shown) by conventional dye collection and return conduit apparatus (not shown). These components do not form a part of the present invention.

As illustrated in all of the figures, a relatively large transverse channel 62 may be formed in the laser mounting block 12 for receiving frequency tuning elements, polarizing elements or other desirable beam treatment elements for the intended purpose of the dye laser 10. These elements are not illustrated in the drawigs, since they do not form a part of the present invention.

From the drawings and the above description, it can been seen that a dye laser construction in accordance with the principles of the present invention achieves a very rigid stability in its resonator cavity, as well as a simplicity of construction not known in previous such lasers. Previous lasers have generally been assembled from a relatively large number of components, making assembly more complex and the opportunity for maladjustment considerably greater, as when the laser is jarred or bumped. Further, the laser mounting block 12 can be formed from a material which has a low thermal expansion coefficient, making the resonator cavity even more stable throughout variations of temperature. Also, the avoidance of use of conventional adjustable mount assemblies for each mirror is very important to the achieving of stability as well as the simplicity of this laser construction.

FIG. 4 shows another embodiment of a dye laser 70 in accordance with the principles of the invention, this embodiment having a straight two-mirror resonator cavity 72, not folded as in the embodiment described above. The principles of the invention are the same, with the two cavity mirrors 74 and 76 rigidly secured to a solid laser mounting block 78. A pumping beam 80 approaches a dye jet 82 via the mirror 74 which in this exemplary embodiment is both an input mirror for focussing the pumping beam and a reflector for the dye mirror, defining one end of the resonator cavity 72. The pump beam 80 approaches in alignment with the dye laser beam 24, in this particular embodiment.

A dye jet mounting block 84, may be similar or substantially identical to the dye jet mounting block 50 described above and shown in FIGS. 2 and 3.

The output mirror 76 is shown attached to a circular mounting plate 86 which is engaged against a spherical depression 88 as described above. A leaf spring type holder 90 is shown to hold the mirror 76 and plate 86 in place.

The laser 10 and 70 are illustrated in the drawing in one orientation for illustrative purposes only. The block and the dye jet may be in various other orientations, and such terms as "up", "down", etc. as used herein are intended only to refer to the laser as represented in the drawing.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:
1. A dye laser of rigid and simplified construction, having dye pumping means and excitation means, and having a folded resonator cavity with three cavity mirrors, comprising:
 a solid laser resonator block of integral, rigid material having three non-collinear cavity mirror mount locations in a folded-cavity configuration, defined by a folding mirror mount location and two end mirror locations,
 openings in said block for passage of a lasing beam in a folded resonating path among said three mirror mount locations,
 three resonator mirrors at said three mirror mount locations, at least one being fixed rigidly, directly and nonadjustably to the block at the respective mirror mount location,
 dye nozzle means supported by said block for producing a dye jet positioned to extend across the laser resonator cavity between two of said three mirrors, said dye nozzle means having means for connection to a dye circulation system,
 pumping beam directing means for receiving and directing a pumping beam to intersect the dye jet where said dye jet crosses the beam resonating path, and
 dye jet adjustment means for adjusting the position and orientation of said dye nozzle means and said dye jet with respect to the resonator cavity and the pumping beam.

2. A dye laser according to claim 1, wherein at least two of the resonator mirrors are fixed rigidly and non-adjustably to the resonator block.

3. A dye laser according to claim 1, wherein all three resonator mirrors are fixed rigidly and non-adjustably to the resonator block.

4. A dye laser according to claim 1, wherein said dye jet adjustment means comprises means for adjusting the rotational orientation of said dye jet and means for adjusting the longitudinal and up/down position of said dye jet with respect to the two mirors between which it is positioned.

5. A dye laser according to claim 4, wherein said dye jet adjustment means comprises a flat surface on said the resonator block, generally parallel to the laser beam path in the resonator cavity between the two mirrors between which said dye jet is positioned, a dye jet mounting block having a flat surface engaged against said flat surface of the resonator block, a dye jet nozzle extending laterally from the dye jet mounting block toward the path of the laser beam in the resonator cavity, with an opening in the laser block provided for receiving said dye jet nozzle and dye jet, and fastening means for securing the flat surface of the dye jet mounting block tightly against the flat surface of the laser block when adjustments have been completed, while allowing rotation and positional translation of the dye jet mounting block on the resonator block prior to securing the fastener means.

6. A dye laser according to claim 1, wherein one resonator mirror is an output mirror and includes spherical tilt adjustment means for adjustment of the angular orientation of the mirror, comprising a spherical depression formed directly in an end of said block, and circular plate means associated with a reflective face of the third mirror for engaging in said spherical depression, whereby gliding movement of said circular plate means in said spherical depression will effect angular adjustment of the mirror, and including means for securing the circular plate means tightly against said spherical depression to hold an adjusted position of the mirror.

7. A dye laser according to claim 6, wherein the circular plate means comprises a mirror mounting plate of circular periphery, with a central opening for passage of the laser beam through the plate and with the mirror fixed to the plate over the central opening.

8. A dye laser according to claim 1, wherein said pumping beam directing means includes a folding focussing mirror with an adjustable mirror mount for adjusting the position and focus of the pumping beam in striking the dye jet.

9. A dye laser according to claim 1, wherein said pumping beam directing means includes a folding focussing mirror fixed rigidly and non-adjustably to a surface of the resonator block.

10. A dye laser of rigid and simple construction, having dye pumping means and excitation means and having a resonator cavity with at least two cavity mirrors, comprising:
 a solid resonator block of integral, rigid material having at least two cavity mirror mount locations, openings in said block for passage of a lasing beam in a resonating path between said mirror mount locations, resonator mirrors at each of the mirror mount locations, at least one being fixed rigidly and non-adjustably to said block at the respective mirror mount location, dye nozzle means supported by the resonator block for producing a dye jet positioned to extend across the laser resonator cavity between two resonator mirrors, said dye nozzle means having connection means for connection to a dye circulation system, pumping beam directing means for receiving and directing a pumping beam to intersect the dye jet where the dye jet crosses the beam resonating path, and dye jet adjustment means for adjusting the position and orientation of the dye jet with respect to the resonator cavity and the pumping beam.

11. A dye laser according to claim 10, wherein said dye jet adjustment means comprises a flat surface on the resonator block, generally parallel to the laser beam path in the resonator cavity between the two mirrors between which the dye jet is positioned, a dye jet mounting block having a flat surface engaged against the flat surface of the resonator block, a dye jet nozzle extending laterally from said dye jet mounting block toward the path of the laser beam in the resonator cavity, with an opening in the laser resonator block provided for receiving the dye jet nozzle and dye jet, and fastening means for securing the flat surface of the dye jet mounting block tightly against said flat surface of the laser block when adjustments have been completed, while allowing rotation and positional translation of the dye jet mounting block on the resonator block prior to securing the fastener means.

* * * * *